Dec. 20, 1960 L. J. HARRISS 2,965,501
FROZEN PIE PACKAGE
Filed Sept. 18, 1953

INVENTOR:
LLOYD J. HARRISS
BY Marshall, Johnston, Cook & Root
ATT'YS

United States Patent Office 2,965,501
Patented Dec. 20, 1960

2,965,501

FROZEN PIE PACKAGE

Lloyd J. Harriss, 5555 Sheridan Road, Chicago, Ill.

Filed Sept. 18, 1953, Ser. No. 380,984

1 Claim. (Cl. 99—192)

This invention relates to a culinary article, the method or process of making and packaging the same, and the utensil used in connection therewith.

In general, the invention comprises a pot pie such as a fruit, berry, vegetable or meat pie, in either a cooked or uncooked state (preferably frozen), the pie filling being contained in the lower part of a utensil formed from a single preformed baking dish made of aluminum foil, and the pie top in an uncooked or dough state, to form the top crust, being of a size and shape to fit over the dish and cover the top of the pie filling; the pie top being contained in the upper part of the utensil which is made in one piece from aluminum foil to form a rimmed plate. The rimmed plate nests in a recess formed by a flange at the upper end or top of the dish, the pie, with all its parts, being readily available to be shipped and stored all ready for baking.

Heretofore frozen food articles, such as biscuits, cakes, pies and the like, have been sold for consumption either in the dough or uncooked state, or in the pre-baked or cooked state. In the case of pies, the pie filling is often placed in a formed dough shell and delivered as a frozen article to be baked later, or they are first baked and then frozen. In the latter instances, whether in the uncooked or dough state, or in the cooked pre-baked state, the liquid, or part liquid, of the filling comes in contact with the pie covering and causes the top to become wet and soggy. This soggy condition occurs in the case of uncooked pies which may be later baked, or in pre-baked pies which are later heated. In either case, the wet, soggy condition of the uncooked or pre-cooked pie will occur whether the pie includes both a top and bottom crust or where it includes only a top crust as in the case of a deep dish or pot pie like that of the present invention.

It is, therefore, the main object of the invention to overcome the inherent disadvantages of present frozen pies and to provide a complete pie, ready for baking, wherein the top pie covering or top remains uncooked and is kept out of contact with the liquid or liquid-like filling, the uncooked dough for the top crust being in a separate plate made of aluminum foil and having nesting relationship with the lower part which is also made of aluminum foil, the upper part or plate fitting into an annular recess formed at the upper end of the main lower part or dish which carries the pie filling.

Another object is to prevent the top covering or unbaked crust of the pie from becoming soggy by maintaining the uncooked pie covering or top separate from the pie filling but juxtaposed with the cooperating lower part of the utensil in which the pie filling is received.

A further object of the invention resides in a new method of forming or preparing a frozen pie with the uncooked pie covering or crust separate from the filling so that after the baking is completed the pie covering will be flaky, light, tasty, and appetizing, and not be wet soggy and doughy as inherent in frozen pies of the kind on the market prior to the advent of the present invention.

A still further object comprises the utilization of a utensil which consists of an aluminum foil container of relatively deep proportions for the filling, and a separate interfitting or nesting aluminum foil plate for the dough top or covering.

Another object resides in the formation of a package comprising a pre-formed deep dish bottom part made of aluminum foil to hold the filling, a rimmed plate-like container also made of aluminum foil and nesting with the dish part and supporting the uncooked dough pie covering out of contact with pie filling, the entire pie and the two utensil parts being arranged in a sanitary covering which is preferably made of transparent material, such as cellophane.

Numerous other objects and advantages will be apparent throughout progress of the specification which follows.

A selected embodiment of the present invention is disclosed in the accompanying drawing wherein.

Figure 1:
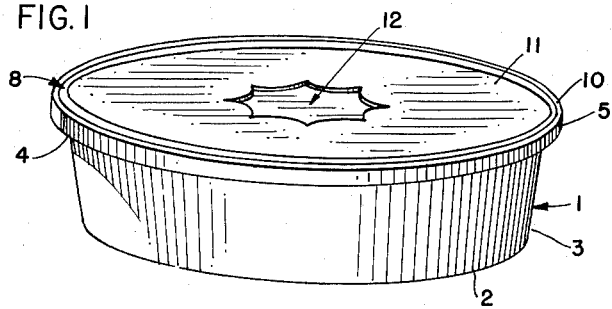
Fig. 1 is a detail elevational view of the culinary article, and specifically depicting a meat pie in its commercial form as delivered to the consumer, either before or after it is frozen but before the pie is baked.
Figure 2:
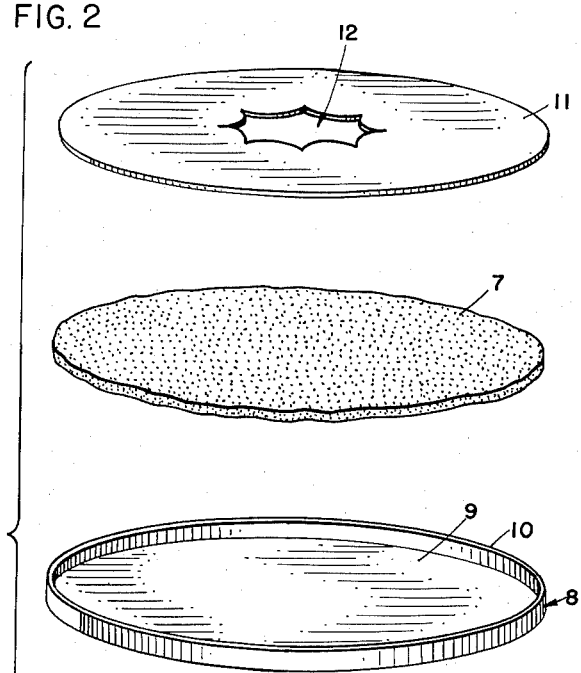
Fig. 2 is an exploded view of certain of the various parts or elements with which the invention is associated, the four elements disclosed in this figure being in the perspective.

The finished packaged article comprises an aluminum foil bottom utensil part 1 in the form of a deep dish-like container, preferably circular in shape, and this part includes a bottom 2, and a surrounding enclosure vertical wall 3 which is integral with the bottom. The upper edge of the wall 3 is formed outwardly horizontally to form a surrounding lip or ledge 4 which is bent to extend upwardly to form a surrounding rim or wall 5. The parts 2 to 5 inclusive are all integral, and are stamped or otherwise formed from a blank (not shown) of aluminum foil. The utensil part 1 comprises a baking dish into which the pie filling 6 is received. The filling 6 may be any kind desirable, such as fruit, berry, vegetable or meat. A meat pie, however, often is a mixture of both meat and vegetables and includes the usual liquid or liquid-like juices or gravy. The present invention specifically shows the latter. The dish or utensil part 1 may be lined with a shell of dough into which the filling or filler 6 may be received. No such lining shell is disclosed herein, but as usual, with meat or pot pies, there is provided a top covering 7 which is placed over the top of the filling.

Figure 3:
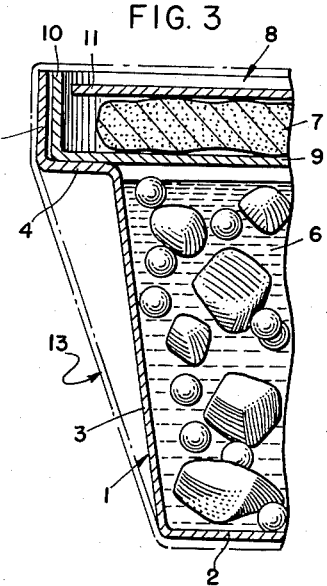
Fig. 3 is a detail vertical sectional view of the completed packaged article in its final form.

Unlike other meat pot pies, the pie of the present invention has the upper cover 7 made of unbaked dough and kept out of contact with the filler 6 so as to prevent it from becoming wet and soggy. The filler cover 7 is contained in a top member which is in the form of a plate 8 and acts as a cover or closure for the bottom dish part 1. The top plate utensil part 8 has a base or bottom 9 from which an upstanding encircling rim 10 is integrally formed. Like the dish 1, the plate 8 is formed from a single piece of aluminum foil, the plate 8 being of such a size that its bottom 9 rests on the annular ledge or lip 4 with the surrounding rim 10 arranged inside of the inner side of the wall or rim 5 of the dish part 1. The plate 8, therefore, nests or has internal interfitting relation with the dish 1, as shown in Fig. 3. It is desirable that the rim 10 be of such a length or height that it will be flush, or even slightly below the upper edge of the surrounding rim 5. The dough 7 is carried on top of the plate 8 and is out of contact with the filling 6, whereby there is no chance of the dough covering 7 of ever becoming wet or soggy. The complete pie, therefore, comprises the filler 6 contained in the dish 1, and the dough pie cover 7 contained in the plate closure 8.

When the pie is ready to be cooked, that is, put in an oven to be baked, the plate 8 may be removed from the dish 1 and the dough cover 7 baked on the plate 8 while the filler is being heated properly in the dish 1. The pie cover dough 7 is thus baked separately from the filling 6 to make it brown, flaky, and crusty, being later placed on top of the filler 6 in the dish 1, if desired. It is not necessary, however, that the top dough crust 7 be baked in the plate 8 separately from the cooking of the filler, as it is perfectly feasible that the dough pie covering 7 be placed on top of the filling 6 and the entire pie baked in the usual pot pie manner. The separate baking of the crust from the filler is more desirable because even the last minute baking of the dough on top of the filler would at least tend to make the underside of the crust somewhat soggy and gummy.

In packing the pie, the bottom dish 1, which holds the filling 6 supports the upper plate part 8 which holds the dough 7, the part 8 nesting with the dish part 1. A cover 11 may be placed on top of the dough 7 if desired, and this cover may contain printed directions or other media on the top, there being sight means, such as a central opening 12, provided in the cover 11 to at least show some of the product below.

A complete, preferably transparent and airtight, dust-proof protective covering 13, such as cellophane, or other wrapper material may be encased or wrapped about the entire package to keep it in a clean and sanitary condition.

The various parts and elements constituting the dish 1, plate 8, dough top 7 and the cover 11 are shown as being circular, but they may be any other shape desired. The dough crust covering 7 may be of a size to overlap the inside edge of the rim 10 and rolled to the desired thickness. The dough, too, may be of a size smaller than the inside diameter of the dish or container 1 at the upper end of the enclosing wall 3 so that the crust may be floated on the filler 6. Also, instead of making the covering 7 in one large piece, several smaller pieces may be used and processed in the same manner, or other material such as biscuits or dumplings may be substituted, the kind of dough and size being immaterial. Also, it is immaterial whether the pie and its crust be shipped and sold for immediate baking, or if the pie be frozen either before or after baking.

The invention provides an article such as a pot pie, the crust of which is unbaked and contained in an open container which fits into and nests with a dish containing the pie filling, or filler. The method or process comprises a novel way of arranging the parts and forming the parts in a predetermined manner, while the utensil contemplates a dish and a nesting plate made of a material which allows the crust and filler to be cooked or baked separately and permitting the two part utensil to be disposable. Also, the particular packaging as well as the formation of the elements is considered unique and novel.

Changes may be made in the form, construction and arrangement of the parts, and the method may be changed or modified, without departing from the spirit of the invention or sacrificing any of its advantages as fall fairly within the scope of the claim which follows.

The invention is hereby claimed as follows:

A frozen pie package comprising: a lower baking dish receptacle made of aluminum foil and having upwardly extending walls, a horizontal supporting ledge extending outwardly at the top of said walls, and an upwardly extending rim surrounding said ledge; an at least partly normally liquid pie filling which is frozen and contained within said lower receptacle; a removable, substantially flat-bottomed aluminum foil plate resting upon said supporting ledge separate from said frozen pie filling in said lower receptacle, said plate having a peripheral rim fitting inside of the rim of said lower receptacle; and a dough pie covering on top of said plate, whereby said covering and said plate are maintained out of contact with said pie filling.

References Cited in the file of this patent

UNITED STATES PATENTS

| | | |
|---|---|---|
| 927,396 | Adams | July 6, 1909 |
| 1,002,780 | Sutherland | Sept. 5, 1911 |
| 1,514,379 | Fleischer | Nov. 4, 1924 |
| 1,889,882 | Woods | Dec. 6, 1932 |
| 1,913,213 | Ristow | June 6, 1933 |
| 1,983,685 | Townsley | Dec. 11, 1934 |
| 2,174,425 | Schlumbohm | Sept. 26, 1939 |
| 2,226,155 | Bjornson | Dec. 24, 1940 |
| 2,245,738 | Taylor | June 17, 1941 |
| 2,424,536 | Mayer et al. | July 22, 1947 |
| 2,469,204 | Peters | May 3, 1949 |
| 2,641,402 | Bruun | June 9, 1953 |
| 2,674,536 | Fisher | Apr. 6, 1954 |

FOREIGN PATENTS

| | | |
|---|---|---|
| 104,915 | Great Britain | Mar. 22, 1917 |
| 212,164 | Great Britain | Mar. 6, 1924 |
| 924,467 | France | Mar. 10, 1947 |

OTHER REFERENCES

Quick Frozen Foods, September 1951, page 94, article entitled "Swanson Launches Chicken Pie."